United States Patent
Mahoney

(10) Patent No.: US 6,875,398 B2
(45) Date of Patent: *Apr. 5, 2005

(54) COHERENT JET SYSTEM WITH OUTWARDLY ANGLED FLAME ENVELOPE PORTS

(75) Inventor: William John Mahoney, East Aurora, NY (US)

(73) Assignee: Praxair Technology, Inc., Danbury, CT (US)

(*) Notice: Subject to any disclaimer, the term of this patent is extended or adjusted under 35 U.S.C. 154(b) by 85 days.

This patent is subject to a terminal disclaimer.

(21) Appl. No.: 10/342,199

(22) Filed: Jan. 15, 2003

(65) Prior Publication Data

US 2004/0135296 A1 Jul. 15, 2004

(51) Int. Cl.⁷ ................................. C21B 7/16
(52) U.S. Cl. .......................... 266/44; 266/268; 431/8
(58) Field of Search ................... 266/44, 225, 268, 266/222; 431/8

(56) References Cited

U.S. PATENT DOCUMENTS

| | | | |
|---|---|---|---|
| 4,622,007 A | 11/1986 | Gitman | 432/13 |
| 5,714,113 A | 2/1998 | Gitman et al. | 266/182 |
| 5,814,125 A | 9/1998 | Anderson et al. | 75/414 |
| 6,096,261 A | 8/2000 | Anderson et al. | 266/225 |
| 6,139,310 A * | 10/2000 | Mahoney et al. | 431/8 |
| 6,171,544 B1 | 1/2001 | Anderson et al. | 266/47 |
| 6,176,894 B1 | 1/2001 | Anderson et al. | 75/414 |
| 6,383,445 B1 | 5/2002 | Anderson et al. | 266/225 |
| 6,432,163 B1 * | 8/2002 | Sarma et al. | 75/414 |
| 6,450,799 B1 | 9/2002 | Mahoney et al. | 431/8 |
| 6,604,937 B1 * | 8/2003 | Mahoney | 266/225 |

* cited by examiner

Primary Examiner—Scott Kastler
(74) Attorney, Agent, or Firm—Stanley Ktorides

(57) ABSTRACT

A coherent jet lance and operating method employing two sets of ports for delivering fuel and oxidant respectively for formation of a flame envelope around one or more gas jets wherein the ports of at least one set and preferably of each set are angled outwardly on the lance face with respect to the lance axis.

17 Claims, 2 Drawing Sheets

COHERENT JET SYSTEM WITH OUTWARDLY ANGLED FLAME ENVELOPE PORTS

TECHNICAL FIELD

This invention relates generally to coherent jet technology.

BACKGROUND ART

A recent significant advancement in the field of gas lancing is the development of the coherent jet technology disclosed, for example, in U.S. Pat. No. 5,814,125—Anderson et al. and in U.S. Pat. No. 6,171,544—Anderson et al. In the practice of this technology one or more high velocity gas jets ejected from one or more nozzles on a lance are maintained coherent over a relatively long distance by the use of a flame envelope around and along the high velocity gas jet(s). The flame envelope is formed by combusting fuel and oxidant ejected from the lance respectively from two rings of ports, an inner ring and an outer ring, around the high velocity gas jet nozzle(s). The ports are oriented in line with, i.e. parallel to, the lance axis. Typically the fuel for the flame envelope is ejected from the inner ring of ports and the oxidant for the flame envelope is ejected from the outer ring of ports. An extension on the lance perimeter forms a protected recirculation zone into which the high velocity gas jet(s) and the flame envelope fluids are provided from the nozzle(s), and ports. This recirculation zone enables some recirculation of the ejected fluids enabling improved ignition and improved stability of the flame envelope, thus enhancing the coherency and thus the length of the high velocity gas jet(s). The coherent jet(s) can be used to deliver gas into a liquid, such as molten metal, from a relatively long distance above the surface of the liquid. One very important application of this coherent jet technology is for providing oxygen for use in steelmaking operations such as electric arc furnaces and basic oxygen furnaces.

The recirculation extension, though constituting an improvement over earlier coherent jet systems, introduces certain problems concerning lance design and lance lifetime due to the need to water-cool the tip. These problems are of particular concern when the coherent jet system is used in a very harsh environment such as a basic oxygen furnace.

Accordingly, it is an object of this invention to provide an improved coherent jet system.

It is another object of this invention to provide a system which can produce effective coherent gas jets without the need for a lance extension or other element to establish a recirculation zone for the gases ejected from the lance.

SUMMARY OF THE INVENTION

The above and other objects, which will become apparent to those skilled in the art upon a reading of this disclosure, are attained by the present invention, one aspect of which is:

A method for establishing at least one coherent gas jet comprising:

(A) passing at least one gas jet out from at least one nozzle housed in a lance having a lance axis and a lance face;

(B) passing fuel out from a first set of ports on the lance face and passing oxidant out from a second set of ports on the lance face, at least one of said first set of ports and second set of ports being at an outward angle to the lance axis; and (C) combusting the fuel and the oxidant passed out from the first and second sets of ports to produce a flame envelope around the said at least one gas jet.

Another aspect of the invention is:

A coherent jet lance comprising:

(A) a lance having a lance axis and a lance face, and having at least one nozzle having an opening at the lance face;

(B) a first set of ports on the lance face and a second set of ports on the lance face, at least one of said first set of ports and second set of ports being oriented at an outward angle to the lance axis; and (C) means for providing fuel to the first set of ports, and means for providing oxidant to the second set of ports.

As used herein the term "lance face" means the surface of a lance abutting an injection volume.

As used herein the term "lance axis" means an imaginary line running longitudinally through the center of a lance.

As used herein the term "coherent jet" means a gas jet which is formed by ejecting gas from a nozzle and which has a velocity and momentum profile along a length of at least 20d, where d is the exit diameter of the nozzle, which is similar to its velocity and momentum profile upon ejection from the nozzle. Another way of describing a coherent jet is a gas jet which has little or no change in its diameter for a distance of at least 20d.

As used herein the term "length" when referring to a coherent gas jet means the distance from the nozzle from which the gas is ejected to the intended impact point of the coherent gas jet or to where the gas jet ceases to be coherent.

DETAILED DESCRIPTION

The invention will be described in detail with reference to the Drawings.

Figure 1:
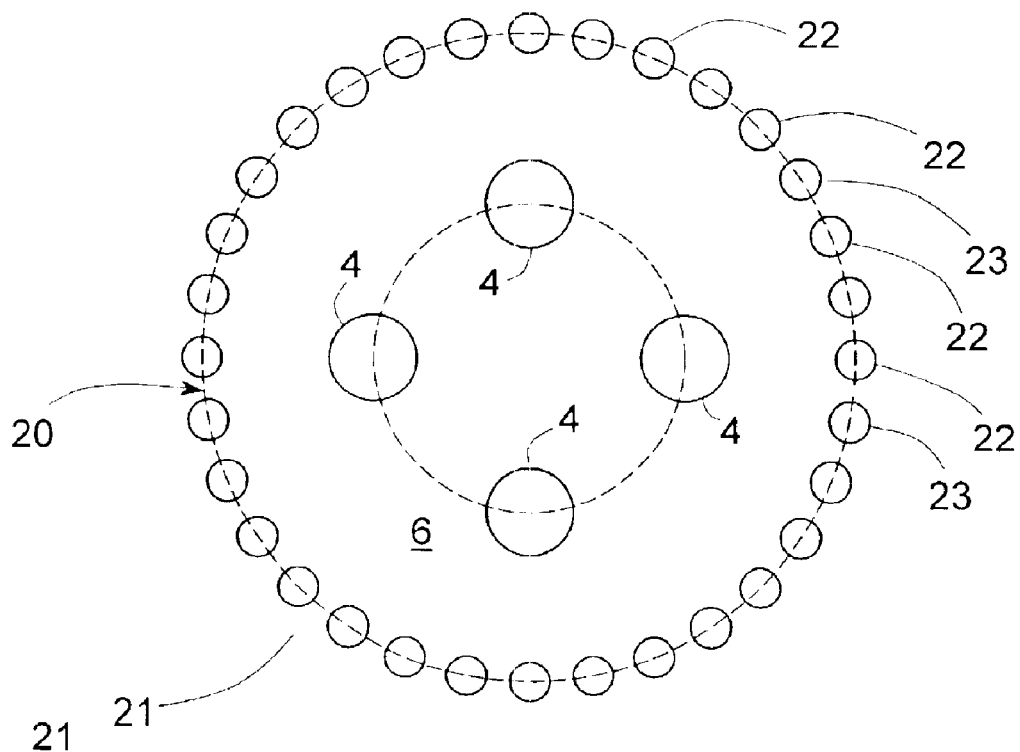
FIG. 1 is a representational head on view of one preferred embodiment of a lance face and FIG. 2 is a representational cross sectional view of one preferred embodiment of a lance having such lance face which may be used in the practice of this invention.
Figure 2:
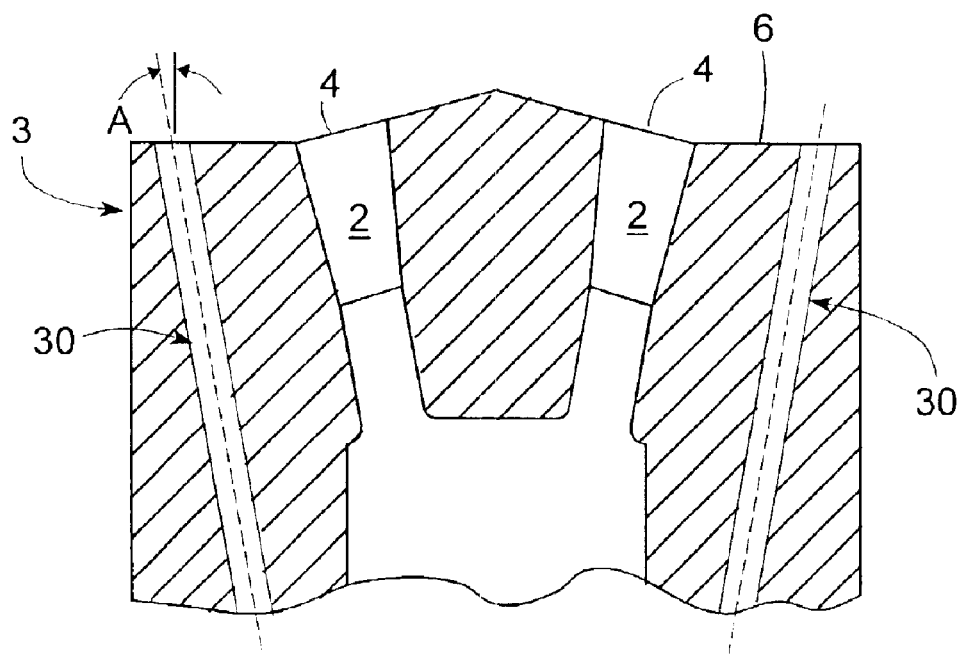
Figure 3:
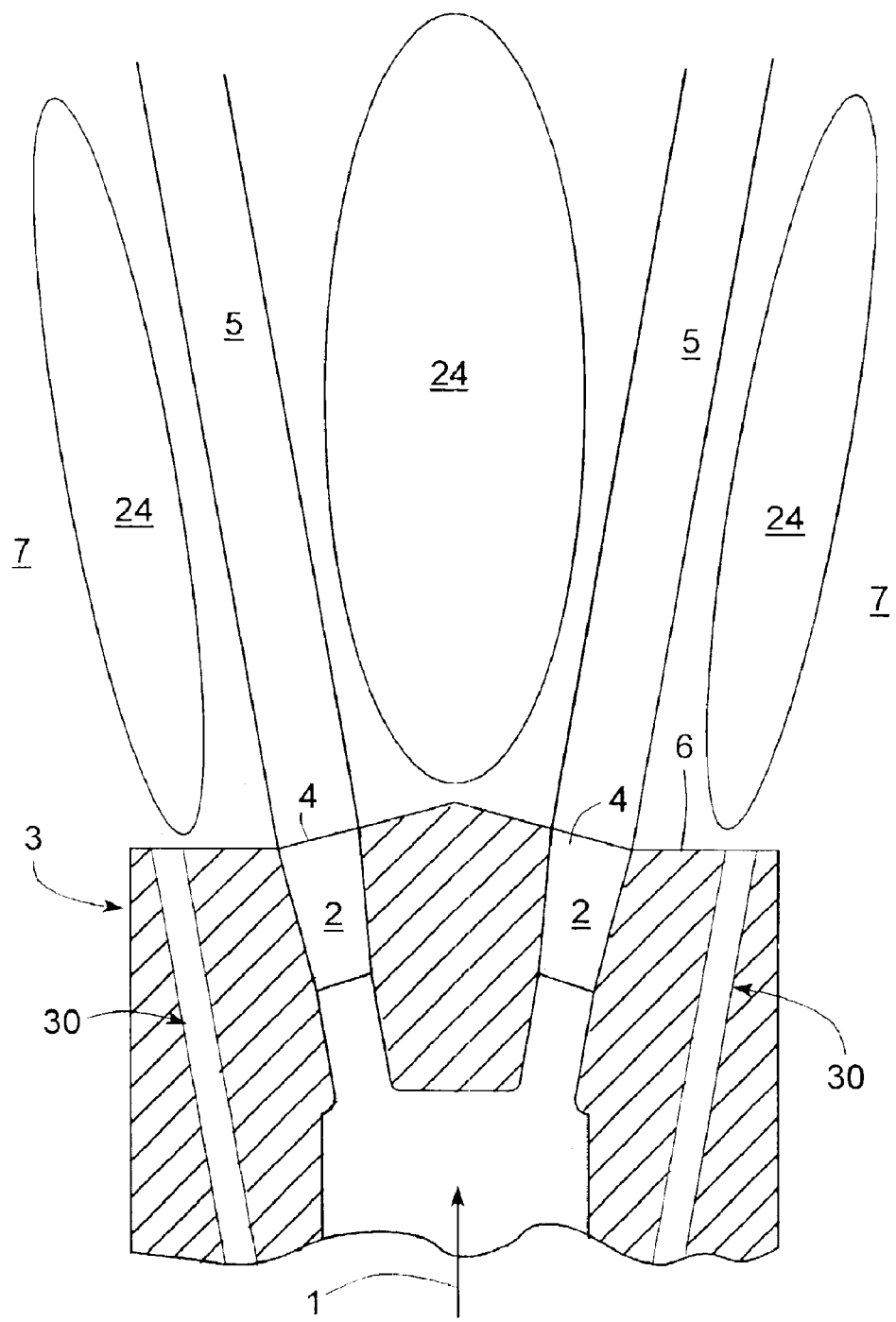
FIG. 3 illustrates the embodiment of the invention illustrated in FIGS. 1 and 2 in operation. The numerals in the Drawings are the same for the common elements.

Referring now to FIGS. 1, 2 and 3, gas as shown by flow arrow 1, is passed through at least one nozzle 2, preferably a converging/diverging nozzle, and then out from lance 3 through nozzle opening or openings 4 on lance face 6 to form a coherent gas jet stream or streams 5 in injection volume 7. Typically the velocity of the gas stream(s) 5 is within the range of from 700 to 3000 feet per second (fps). Preferably the velocity of the gas stream(s) 5 is supersonic when it is formed upon ejection from the lance face and remains supersonic for a distance of at least 20d. Although the Drawings illustrate an embodiment employing four coherent gas jets ejected from the lance respectively through four nozzles, the number of gas jets ejected from the lance through respective nozzles in the practice of this invention may be within the range of from 1 to 6. Preferably the injection volume into which the coherent gas jets are injected is a metal producing furnace such as a steelmaking furnace. Most preferably, when a plurality of nozzles is employed, each nozzle is angled away from each other and from the lance axis.

Any effective gas may be used as the gas for forming coherent jet or jets in the practice of this invention. Among such gases one can name oxygen, nitrogen, argon, carbon dioxide, hydrogen, helium, steam and hydrocarbon gases. Also mixtures comprising two or more gases, e.g. air, may be used as such gas in the practice of this invention.

In the practice of this invention a flame envelope is formed around jet(s) 5 by combusting fuel and oxidant provided into injection volume 7 respectively through first and second sets of ports, wherein the ports of at least one of the first and second sets of ports and preferably wherein the ports of each of the first and second sets of ports are oriented at an outward angle to the lance axis or centerline. The outward angle, referred to below as angle A, is typically up to 45 degrees and preferably within the range of from 5 to 18 degrees. Typically the outward angle of the first set of ports is the same as the outward angle for the second set of ports. The first set of ports may be arranged in a first ring on the lance face around nozzle opening(s) 4, with the first ring of ports having a diameter generally within the range of from 1.5 to 16 inches. The second set of ports may be arranged in a second ring on the lance face around the nozzle opening(s) and also around the first ring of ports, with the second ring of ports having a diameter greater than that of the first ring of ports and generally within the range of from 2 to 17 inches. The Drawings illustrate a preferred embodiment of the invention wherein both the first set of ports and the second set of ports are positioned in a single ring around the nozzle opening(s) and have the same outward angle.

Referring back now to the Drawings, a ring 20 of ports is located on the lance face around the nozzle opening or openings 4. Ring 20 is preferably a circle having a diameter within the range of from 1.5 to 16 inches. Generally ring 20 will comprise from 12 to 48 ports. Each port is preferably a circle having a diameter within the range of from 0.05 to 0.5 inch. Most preferably the ports in the ring are in a recession or groove on lance face 6 having a depth within the range of from 0.05 inch to 2 inches and a width within the range of from 0.05 to 0.5 inch.

Fuel is provided to a first set of ports 22 on ring 20 and oxidant is provided to a second set of ports 23 on ring 20. Preferably, as illustrated in FIG. 1, the first set of ports 22 alternates with the second set of ports 23 on ring 20 so that each fuel port 22 has two oxidant ports 23 adjacent on either side of that fuel port, and each oxidant port 23 has two fuel ports 22 adjacent on either side of that oxidant port. The first set of ports or fuel ports, and the second set of ports or oxidant ports, are oriented at an outward angle A with respect to the lance axis. The fuel and oxidant are ejected from lance 3 from their respective ports into injection volume 7 at said outward angle A. The velocity of the fuel and oxidant ejected from the ring of ports may be subsonic but preferably it is at sonic velocity. Sonic velocity of the injected fuel and oxidant enhances the rejection of foreign matter from entering and plugging the ports, which is especially important when the invention is employed in a harsh environment such as a steelmaking furnace. If desired, the velocity of the injected fuel and oxidant may be supersonic such as at a velocity of greater than Mach 1 up to Mach 2. The fuel and the oxidant is preferably provided to the appropriate respective ports by means of passageways 30 which are preferably oriented at an outward angle to the lance axis, most preferably the same outward angle as that of the first and second sets of ports The fuel ejected from ports 22 is preferably gaseous and may be any fuel such as methane or natural gas. The oxidant ejected from ports 23 may be air, oxygen-enriched air having an oxygen concentration exceeding that of air, or commercial oxygen having an oxygen concentration of at least 90 mole percent. Preferably the oxidant is a fluid having an oxygen concentration of at least 25 mole percent.

The fuel and oxidant passed out from the lance form a gas envelope around gas jet(s) 5 which combusts to form a flame envelope or flame shroud 24 around the gas jet(s) 5 within the injection volume such as a molten metal furnace. Flame envelope 24 around the gas streams 5 serves to keep ambient gas, e.g. furnace gases, from being drawn into or entrained into the gas streams, thereby keeping the velocity of gas streams from significantly decreasing and keeping the diameter of the gas streams from significantly increasing, for at least a distance of 20d from the respective nozzle exit. That is, the flame envelope or flame shroud 24 serves to establish and maintain gas streams 5 as coherent jets for a distance of at least 20d from the respective nozzle exit.

A significant advantage of this invention is the ability to form effective coherent gas jets from a lance without the need to employ an extension on the lance. Heretofore a lance extension has been used to form a protected recirculation zone adjacent the lance face to improve the ignition and combustion of the flame shroud gases which are injected into this protected recirculation zone, thus improving the coherency of the gas jets. While the use of such a lance extension is a significant improvement over the initial coherent gas jet practice, there are problems with the use of such an extension. In the practice of this invention, the gases ejected from the lance may be passed directly into the injection volume without passing through a protected zone or recirculation zone formed by a lance extension, yet the improved coherency observed with the use of a lance extension is still achieved.

Although the invention has been described in detail with reference to certain preferred embodiments, those skilled in the art will recognize that there are other embodiments of the invention within the spirit and the scope of the claims.

What is claimed is:

1. A method for establishing a plurality of coherent gas jets comprising:

(A) passing a plurality of gas jets out from a plurality of nozzles housed in a lance having a lanqe axis and a lance face, each nozzle being angled away from each other and from the lance axis;

(B) passing fuel out from a first set of ports on the lance face and passing oxidant out from a second set of ports on the lance face, at least one of said first set of ports and second set of ports being at an outward angle to the lance axis; and (C) combusting the fuel and the oxidant passed out from the first and second sets of ports to produce a flame envelope around the said plurality of gas jets.

2. The method of claim 1 wherein both the first set of ports and the second set of ports are positioned in one ring on the lance face.

3. The method of claim 2 wherein the first set of ports alternates with the second set of ports on the ring.

4. The method of claim 1 wherein both the first set of ports and the second set of ports are oriented at an outward angle to the lance axis.

5. The method of claim 4 wherein the first set of ports and the second set of ports are oriented at the same outward angle.

6. The method of claim 4 wherein at least one of the outward angle of the first set of ports, and the outward angle of the second set of ports is within the range of from 5 to 18 degrees.

7. The method of claim 1 wherein the gas jets passed out from the lance have a supersonic velocity.

8. The method of claim 1 wherein the velocity of the fuel and the oxidant passed out from the first and second sets of ports is sonic.

9. The method claim 1 wherein the said gas jets and the fuel and the oxidant are passed out from the lance directly into an injection volume without passing through a recirculation zone formed by an extension on the lance.

10. The method of claim 1 wherein the said gas jets and the fuel and the oxidant are passed out from the lance into a molten metal furnace.

11. A coherent jet lance comprising:
   (A) a lance having a lance axis and a lance face, and having a purality of nozzles each having an opening at the lance face, each nozzle angled being away from each other and from the lance axis;
   (B) a first set of ports on the lance face and a second set of ports on the lance face, at least one of said first set of ports and second set of ports being oriented at an outward angle to the lance axis; and
   (C) means for providing fuel to the first set of ports, and means for providing oxidant to the second set of ports.

12. The coherent jet lance of claim 11 wherein both the first set of ports and the second set of ports are positioned in one ring on the lance face.

13. The coherent jet lance of claim 12 wherein the first set of ports alternates with the second set of ports on the ring.

14. The coherent jet lance of claim 11 wherein both the first set of ports and the second set of ports are oriented at an outward angle to the lance axis.

15. The coherent jet lance of claim 14 wherein the first set of ports and the second set of ports are oriented at the same outward angle.

16. The coherent jet lance of claim 14 wherein at least one of the outward angle of the first set of ports and the outward angle of the second set of ports is within the range of from 5 to 18 degrees.

17. The coherent jet lance of claim 11 having no extension to form a recirculation zone adjacent the lance face.

* * * * *

UNITED STATES PATENT AND TRADEMARK OFFICE
CERTIFICATE OF CORRECTION

PATENT NO.     : 6,875,398 B2
DATED          : April 5, 2005
INVENTOR(S)    : W. J. Mahoney It is certified that error appears in the above-identified patent and that said Letters Patent is hereby corrected as shown below:

Column 4,
Line 36, delete "lanqe" and insert therefor -- lance --.

Signed and Sealed this

Seventh Day of June, 2005

JON W. DUDAS
*Director of the United States Patent and Trademark Office*